D. O. C. KERSTEN.
COTTER PIN TOOL.
APPLICATION FILED JAN. 12, 1910.
987,238.
Patented Mar. 21, 1911.
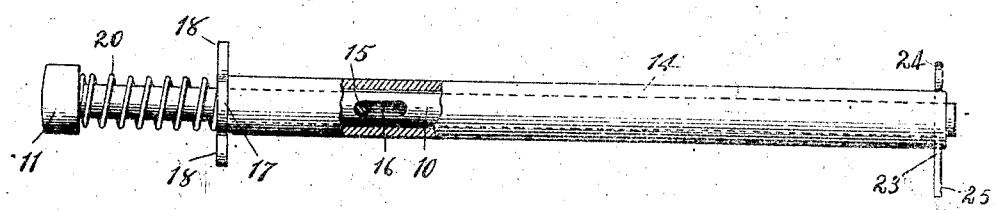
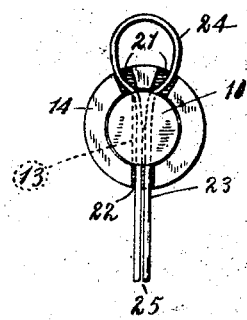 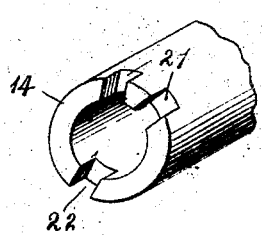 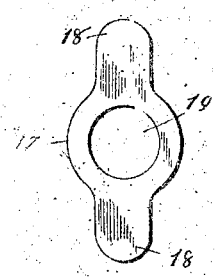
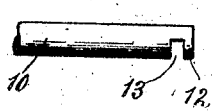 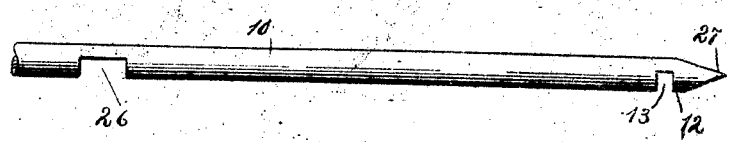
Witnesses:
C. F. Bassett
M. A. Milord
Inventor
DEna O. C. Kersten
By Frederick Benjamin
Atty.

UNITED STATES PATENT OFFICE.

DENA O. C. KERSTEN, OF DETROIT, MICHIGAN.

COTTER-PIN TOOL.

987,238.  Specification of Letters Patent.  Patented Mar. 21, 1911.

Application filed January 12, 1910. Serial No. 537,594.

*To all whom it may concern:*

Be it known that I, DENA O. C. KERSTEN, citizen of the United States, residing at Detroit, in the county of Wayne and State of Michigan, have invented certain new and useful Improvements in Cotter-Pin Tools, of which the following is a specification.

My invention relates to gripping or holding tools and the device is especially adapted to seize and hold a cotter pin to facilitate its introduction into the hole or seat in the bolt, pin or other piece to which it corresponds.

The chief objects of the improvements which form the subject matter of this application for patent are:—to provide a simple and convenient tool for the purpose stated; to furnish a cotter pin gripping device that will hold the pin firmly in the desired position relatively to the holder and with the point of the pin projecting, thus enabling the operator to readily insert a pin of this type in localities that are inaccessible to the hand or ordinary pliers or tongs, the firm hold which is afforded upon the pin preventing the latter from being accidentally released or forced from the gripping jaws during the effort to insert the point of the pin in the eye or hole which it is designed to fit.

Another object is to facilitate the release of the tool from engagement with the pin when the latter has become properly seated.

A further object of the invention is to furnish means for quickly and conveniently spreading the points of the split key or cotter pin so that it will be firmly fixed in its seat.

I accomplish the desired results by means of the tool illustrated in the accompanying drawing which forms a part of this application, the details of construction being disclosed in the following views:—

Figure 1 is a side elevation of my improved cotter pin holder, with a cotter pin engaged by the gripping members; the remaining figures are drawn to an enlarged scale; Fig. 2 is a view of the gripping end of the device with a cotter pin engaged thereby; Fig. 3 is a perspective view of the notched end of the sleeve which forms one of the gripping members; Fig. 4 is a detail of the finger plate; Fig. 5 is a fragmentary view showing the notched end of the stem; Fig. 6 is a slightly modified form of the stem.

Referring to the details of the drawing, the numeral 10 indicates a cylindrical stem or rod, provided with a head 11, and having its opposite end provided with a shoulder or lip 12, formed by a notch 13. Surrounding the said stem 10 and slidably mounted thereon is a tube or sleeve 14, secured in position by a stop pin 15 which extends transversely through both sleeve and stem. The said pin 15 is fixed in the sleeve but passes loosely through a slot 16 in the stem 10, thus permitting a limited longitudinal movement of the sleeve upon the stem, but preventing any relative rotary movement of either member. The stem 10 projects beyond the sleeve 14 at the rear or headed end, and upon the exposed portion of said stem is loosely mounted a finger plate 17, having projecting ends 18, and a central aperture 19 for the stem upon which it slides.

A coiled extension spring 20 embraces the stem, the ends of the spring abutting against the head 11 and finger plate 17 respectively, the pressure of the spring 20 tending to extend the sleeve toward the pointed end of the stem. The front end of said sleeve is furnished with three marginal notches 21, 22. There are two of the notches 21, spaced a short distance apart, and the position of the third notch 22 is diametrically opposite the middle point between the first mentioned notches. The purpose of these notches is to receive a cotter pin 23, the ring 24 of the pin engaging the duplicate notches 21 in the manner shown in Fig. 2 while the body of the pin passes through the notch 13 in the stem 10, and is lodged in the single notch 22, the end 25 of the pin projecting considerably beyond the sleeve 14. When the cotter pin is thus engaged, the action of the spring 20 will be to force the notched end of the sleeve toward the point of the stem thus gripping the said pin 23 tightly between the bottoms of the notches 21, 22 and the lip 12, while the sides of the notches will prevent any lateral displacement.

In Fig. 6 I have shown a notch 26 in the stem for the stop pin 12, which may be substituted for the slot 16, thus simplifying and cheapening the manufacture. In the same figure the end of the stem is made pointed or beveled to form a wedge 27, which may be used to spread the points of the cotter pin after it has been inserted in its seat.

To insert a cotter pin in the holder the operator compresses the spring so that the sleeve may be retracted and allow the notched end of the stem or rod to protrude sufficiently to permit the pin to be placed in the notches in the position shown in the drawing, and upon releasing the spring the pin will be firmly gripped as previously described. The purpose of the finger plate is to afford a secure abutment for the fingers while the spring is being retracted and also to serve as a finger hold while carrying the point of the tool to the location of the bolt, or other part containing a hole or seat for the pin for the purpose of inserting the latter. After the body of the pin has been inserted in its seat, the spring is again compressed so as to loosen the grip of the clamping members upon the pin, and the tool may then be readily removed, leaving the pin in its proper position. To spread the ends of the cotter pin the wedge shaped end 27 is inserted between the prongs of the pin and the tool then given a slight twist to spread these prongs apart.

Having thus described my invention, what I claim as new, is:—

1. A tool for holding a cotter pin, including a stem having a notch adjacent to one end, a sleeve slidable on said stem, and having marginal notches adapted to register with the said notch in the stem, a spring adapted to normally extend the sleeve upon the said stem, means for manually retracting the sleeve, and means for limiting the relative movement of the stem and sleeve.

2. A tool for holding a cotter pin comprising a stem having a pointed end and provided with a notch adjacent to said end, a sleeve slidable on said stem and having marginal notches adapted to register with said notch in the stem, a spring adapted to extend the sleeve relatively to the stem and means for limiting the movement of the sleeve on the stem.

In testimony whereof I affix my signature in the presence of two witnesses.

DENA O. C. KERSTEN.

Witnesses:
 MEYER A. PEREIRA,
 PAUL R. LANG.